United States Patent [19]

Wada

[11] Patent Number: 4,769,097
[45] Date of Patent: Sep. 6, 1988

[54] METHOD OF FIXING MEMBER IN CERAMIC BODY AND A CERAMIC BODY WITH A MEMBER MANUFACTURED BY THE METHOD

[75] Inventor: Ichiro Wada, Yokohama, Japan

[73] Assignee: Kabushiki Kaisha Toshiba, Kawasaki, Japan

[21] Appl. No.: 12,489

[22] Filed: Feb. 9, 1987

[30] Foreign Application Priority Data

Feb. 12, 1986 [JP]  Japan .................................. 61-26839

[51] Int. Cl.$^4$ ......................... B32B 18/00; B32B 31/26
[52] U.S. Cl. .................................. 156/85; 156/86; 156/89; 156/293; 156/294
[58] Field of Search ............... 156/89, 293, 294, 84, 156/85, 86; 228/120, 126, 131, 903; 264/61, 67, 332, 346, 342 R; 73/861.12

[56] References Cited

U.S. PATENT DOCUMENTS

| | | | |
|---|---|---|---|
| 3,213,337 | 10/1965 | Long | 264/61 |
| 3,389,215 | 6/1968 | Rice et al. | 156/89 |
| 3,746,896 | 7/1973 | Gruner | 73/861.12 |
| 4,286,378 | 9/1981 | Micheli | 264/61 |
| 4,422,233 | 12/1983 | Habdas et al. | 264/61 |
| 4,424,090 | 1/1984 | Kyle | 156/89 |
| 4,444,667 | 3/1984 | August et al. | 73/861.12 |
| 4,507,975 | 4/1985 | Bittner et al. | 73/861.12 |
| 4,579,703 | 4/1986 | Adlerborn et al. | 156/89 |

FOREIGN PATENT DOCUMENTS 3318585 11/1984 Fed. Rep. of Germany .

Primary Examiner—Caleb Weston
Attorney, Agent, or Firm—Oblon, Fisher, Spivak, McClelland & Maier

[57] ABSTRACT

A nonsintered ceramic body is prepared. A hole is formed in the nonsintered ceramic body. A rod is inserted into the hole. The rod has large- and small-diameter portions within the area facing to the hole. The ceramic body is sintered while the rod is inserted into the ceramic body. By this sintering, the ceramic body is brought into tight contact with the rod by utilizing shrinkage of the ceramic body. The resultant structure is cooled. As a result, the large diameter portion of the rod presses a projection of the ceramic body extending inside the hole by a shrinkage difference due to the difference between the thermal expansion coefficients of the ceramic body and the rod. At least part of the ceramic body is brought into tight contact with at least part of the rod. The rod closes the hole of the ceramic body and the rod is fixed in the ceramic body.

18 Claims, 2 Drawing Sheets

METHOD OF FIXING MEMBER IN CERAMIC BODY AND A CERAMIC BODY WITH A MEMBER MANUFACTURED BY THE METHOD

BACKGROUND OF THE INVENTION

The present invention relates to an improvement in a method of fixing a member in a ceramic body and a ceramic body with a member fixed in it by the method, and more particularly, to a method of fixing the member in the ceramic body when the thermal expansion coefficient of the ceramic body is smaller than that of the member.

Examples of products manufactured by sealing rod-like articles (to be referred to as rods hereinafter) in ceramic articles (to be referred to as ceramic bodies hereinafter), that is, products in which rods close holes of ceramic bodies and are mounted therein, are (1) lead electrodes mounted and extending through the wall of a ceramic vacuum tube, (2) electrodes mounted and extending through the wall of a ceramic sample container in a conductimeter meter, and (3) electrodes mounted and extending through the wall of a ceramic measuring tube in an electromagnetic flowmeter.

A conductive rod is fixed in a ceramic body according to the following steps of a conventional technique: (1) A nonsintered ceramic body made of, for example, magnesia (MgO) is prepared. The ceramic body is a soft material prepared by pressing a mixture of, for example, magnesia micropowder and a plastic binder; (2) A hole is formed in the ceramic body; (3) The ceramic body is sintered at a relatively low temperature (generally 200°~300° C.) for dewaxing the binder included in the ceramic body; (4) A rod made of, for example, platinum is inserted in the hole; (5) The ceramic body and the rod are sintered at a sintering temperature (generally, 1,000° C. to 1,500° C.) determined by the kind of ceramic material. The ceramic body shrinks at a line shrinkage coefficient of 16% (corresponding to a volume shrinkage coefficient of 41%) to 26% (corresponding to a volume shrinkage coefficient of 60%) when the ceramic body is sintered. Therefore, no gap is formed between the rod and the hole of the ceramic body at a high temperature after sintering; and (6) When the temperature of the sintered body is cooled to room temperature, the ceramic body shrinks greater than the rod since the thermal expansion coefficient of ceramic is bigger than that of the rod. As a result, the ceramic body tightens the rod with a large force, and the rod closes the hole of the ceramic body and fixed therein.

In the above process, magnesia or forsterite is used as ceramic, and platinum is used as the rod material. Therefore the thermal expansion coefficient of the ceramic body is larger than that of the rod, no problem is presented. However, if alumina (Al$_2$O$_3$) or spinel (MgO.Al$_2$O$_3$) having a better anti-corrosion property than that of magnesia or forsterite is used, the following disadvantage is presented. Thermal expansion coefficient $\alpha$ of alumina (Al$_2$O$_3$) or spinel (MgO.Al$_2$O$_3$) is 7.1 to 7.3×10$^{-6}$ and is smaller than thermal expansion coefficient $\beta$=8.9×10$^{-6}$ of platinum. For this reason, if a platinum rod is fixed in an alumina ceramic body by the above-mentioned conventional method, the rod shrinks greater than the wall surface defining the hole. A gap is formed between the rod and the wall surface defining the hole, so the rod cannot be fixed in the ceramic body, and an air-tight state between the hole and the rod cannot be guaranteed.

SUMMARY OF THE INVENTION

Objects of the present invention are to provide a method of firmly fixing a member in a ceramic body, and a ceramic body with a member fixed in it by the method.

According to the present invention, there is provided a method of fixing a member in a ceramic body, comprising the steps of: preparing a ceramic body (11); forming a hole (12) in the ceramic body (11); inserting the member (13) into the hole (12), the member (13) including a first portion (14, 16) and a second portion (15) being thinner than the first portion (14, 16), at least a part of said first portion (14, 16) and at least a part of said second portion (14, 16) being inserted in the hole (12); and sintering a resultant structure.

With the above steps, according to the fixing method of the present invention, the ceramic shrinks in the step of sintering the resultant structure and fills a space between the second portion of the member and the inner surface wall defining the hole. When the sintered body is cooled to room temperature after sintering, the rod is moved close to, or is made to contact a ceramic body portion extending in the hole. For this reason, the extended portion of the ceramic body is air-tightly brought into contact with the member. Even if the thermal expansion coefficient of the rod is larger than that of the ceramic body, the rod can be firmly fixed to the ceramic body.

DETAILED DESCRIPTION OF THE PREFERRED EMBODIMEMTS

A method of fixing a rod (a rod-like article) into a ceramic body (a ceramic article) according to an embodiment of the present invention will be described with reference to FIGS. 1A to 1E.

Figure 1A:
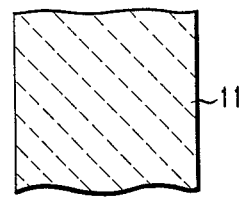
FIGS. 1A to 1E are sectional views for explaining the steps in a sealing method according to an embodiment of the present invention.

(1) Nonsintered ceramic body 11 made of, e.g., alumina (Al$_2$O$_3$) having thermal expansion coefficient $\alpha$=7.1 to 7.3×10$^{-6}$) is prepared, as shown in FIG. 1A.

Figure 1B:
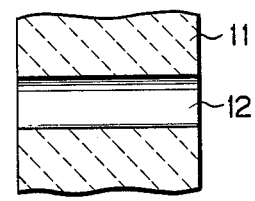

(2) Hole 12 is formed in ceramic body 11, as shown in FIG. 1B.

Figure 1C:
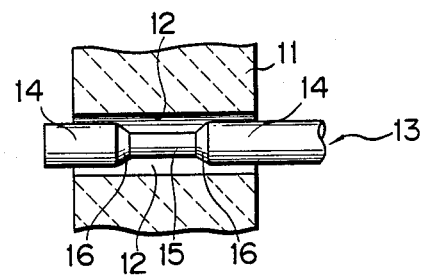
Figure 1D:
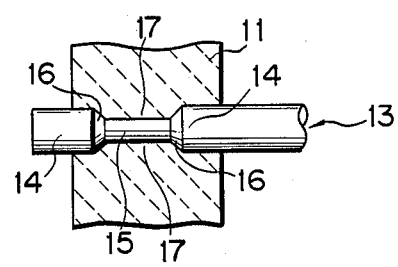

(3) Rod 13 made of platinum (Pt) having thermal expansion coefficient $\beta$=8.9×10$^{-6}$ is inserted in hole 12 formed in ceramic body 11, as shown in FIG. 1C. Both end portions 14 of the inner surface of rod 13 which faces the inner surface defining hole 12 are thick, and central portion 15 is thin. Boundary portions (stepped portions) 16 between large-diameter portions 14 and small-diameter portion 15 of rod 13 are constituted by inclined surfaces. Portions 14, 15, 16 are located in hole 12.

(4) Ceramic body 11 shown in FIG. 1C is sintered at relatively low-temperature (200° C.~300° C.). After that resultant structure is sintered at an alumina sintering temperature. Ceramic body 11 shrinks at a line shrinkage coefficient of 16 to 26% during sintering. For this reason, after sintering, rod 13 is brought into tight contact (without a gap) with the inner surface of ceramic body 11 which defines hole 12.

Figure 1E:
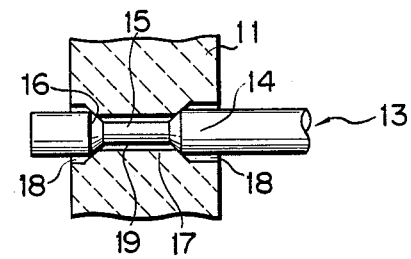

(5) When sintering is completed, the resultant structure is cooled to room temperature. In this case, rod 13 shrinks greater than ceramic body 11 because line shrinkage coefficient $\beta$ of the rod is bigger than line shrinkage coefficient $\alpha$ of the ceramic body. As shown in FIG. 1E, radial shrinkage of the rod forms gaps 18 and 19 between the inner surface defining hole 12 and portions of rod 13 parallel to the outer surface. Rod 13 also shrinks along the axial direction thereof. However, stepped portions 16 of rod 13 are respectively brought into contact with both ends of extended portions 17 of hole 12. For this reason, rod 13 cannot further shrink from the state wherein stepped portions 16 are in contact with portions 17. A tension stress acts on small-diameter portion 15 of rod 13. Stepped portions 16 press both ends of extended portion 17 of ceramic body 11 inside hole 12, thereby keeping air-tightness between ceramic body 11 and rod 13 (i.e., rod 13 closes hole 12 and is fixed in ceramic body 11).

According to the fixing method of the conductive rod into the ceramic body, even if linear expansion coefficient $\alpha$ of the ceramic body is smaller than linear expansion coefficient $\beta$ of the rod, the hole of the ceramic body can be closed, and the rod can be fixed in the ceramic body.

Applications of the above-mentioned method will be described below.

Figure 2:
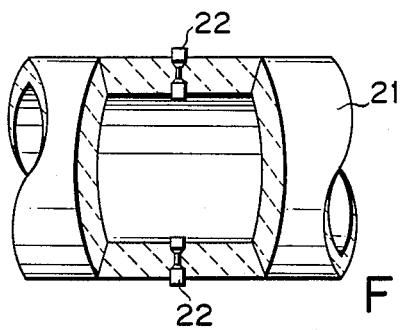
FIG. 2 is a partially cutaway plan view of a flow pipe to explain the case wherein the method in FIGS. 1A to 1E is applied to mounting of electrodes into a pipe in an electromagnetic flowmeter.

FIG. 2 shows an application wherein platinum electrodes 22 are mounted in the wall of ceramic measuring pipe 21 in an electromagnetic flowmeter. A material of pipe 21 is, e.g., alumina. Linear expansion coefficient $\alpha$ of pipe 21 is smaller than linear expansion coefficient $\beta$ of electrodes 22.

A method of mounting electrodes 22 in measuring pipe 21 shown in FIG. 2 will be described below. Small-diameter portions are respectively formed in electrodes 22. Holes are formed in prospective electrode mounting portions of pipe 21. Electrodes 22 are respectively inserted in these holes. The resultant structure is then sintered and cooled. By these steps, electrodes 22 close holes in pipe 21 and are fixed therein.

The operation of the electromagnetic flowmeter in FIG. 2 will be described below. A fluid to be measured flows in measuring pipe 21. Excitation coils (not shown) apply a magnetic field of, e.g., a rectangular wave to the fluid. The coils are arranged, for example, at angular positions rotated through 90° from electrodes 22. A voltage induced in the fluid by an interaction between the applied magnetic field and the fluid is detected by electrodes 22. A voltage signal detected by electrodes 22 is processed by a known signal processing circuit. Thus, the flow rate of the fluid is measured.

Figure 3A:
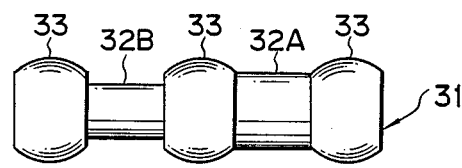
FIGS. 3A to 3D are views for explaining other embodiments of the structure of the rod.
Figure 3B:
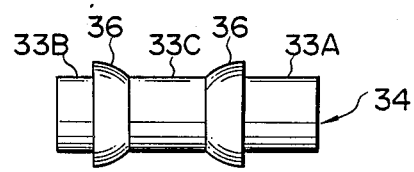
Figure 3C:
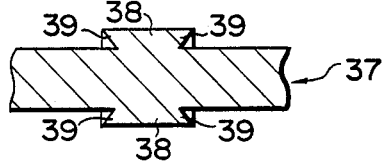
Figure 3D:
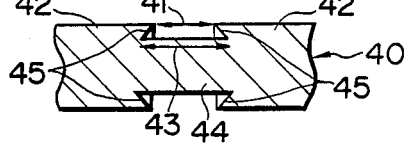

FIGS. 3A to 3D show modifications of rods mounted in ceramic bodies. FIGS. 3A and 3B are plan views showing embodiments of rods, and FIG. 3C and 3D are sectional views showing embodiments of the rod. Rod 31 shown in FIG. 3A has two divided small-diameter portions 32 of different diameters. Small-diameter portion 32A has a diameter larger than that of small-diameter portion 32B. The outer surfaces of large-diameter portions 33 are spherical. The reason why small-diameter portions 32A and 32B have different diameters is to guarantee the air-tight state even if a defect is formed in the ceramic body during sintering. The reason why large-diameter portions have spherical outer surfaces is to allow smooth sliding contact with ceramic and to guarantee the air-tight state between the rod and the ceramic body.

Rod 34 shown in FIG. 3B has three small-diameter portions 33, and outer small-diameter portions 33A and 33B constitute both ends of rod 34. Outer surface portions of large-diameter portions 36 which face toward central small-diameter portion 33C are spherical to obtain the same effect as in FIG. 3A.

Large-diameter portion 38 of rod 37 shown in FIG. 3C has a wedge shape. By this shape, projection 39 of large-diameter portion 38 presses the ceramic body projecting inside the hole. The rod closes the ceramic body and is mounted therein.

Length 41 of an opening between the large-diameter portions 42 of rod 40 shown in FIG. 3D is shorter than length 43 of small-diameter portion 44. Opposing side walls 45 of the large-diameter portions 42 are inclined in opposing acute angles.

Figure 4A:
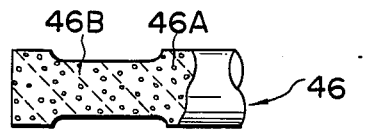
FIGS. 4A and 4B are partially cutaway plan views for explaining other embodiments of the material of the rod.
Figure 4B:
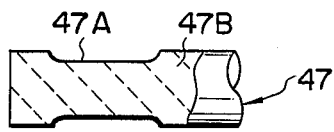

FIGS. 4A and 4B show other embodiments of rods mounted in ceramic bodies. FIG. 4A shows cermet electrode 46 sintered by mixing a conductive material such as platinum powder into ceramic. FIG. 4B shows conductive electrode 47 sintered after applying a conductive material such as a platinum paste to the surface of the ceramic body. Conductivity of electrodes 46 and 47 is provided by conductive materials 46A and 47A. Ceramic portions 46B and 47B provide good adhesion with the ceramic body. In either rod, the small-diameter portions are formed beforehand. Therefore, these rods can be firmly fixed in the ceramic bodies according to the method of FIGS. 1A to 1E.

The sectional shape of the rod is not limited to a circular shape, but may be replaced with a rectangular or triangular shape. It is thus essential to form large- and small-diameter portions constituting the rod.

Figure 5:
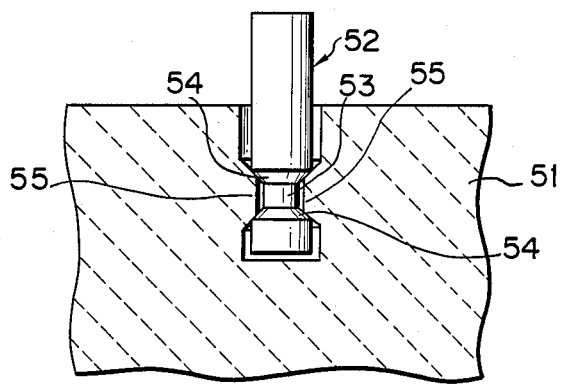
FIG. 5 is a plan view for explaining a method according to another embodiment of the present invention.

The present invention is not limited to the case wherein the rod is extended through the ceramic body and mounted therein. The rod need not extend through the ceramic body. FIG. 5 shows conductive stud 52 extending on ceramic body 51. In this case, if stud 52 is made of platinum and alumina is used for ceramic body 51, relationship $\alpha < \beta$ is established. Small-diameter portion 53 is formed in the embedded portion of stud 52 beforehand, and stud 52 is fixed according to the method of FIGS. 1A to 1E. In this case, stud 52 is fixed into the ceramic body by a force acting between the extended portion of the ceramic body and the stepped portions of stud 52. The present invention is not only applied to the case wherein the rod extends through the ceramic body and closes the hole of the ceramic body, but also to the case wherein the rod is partially embedded in the ceramic body.

In the above description, the rods are fixed in the ceramic bodies. However, the member to be fixed is not limited to a rod-like member but may be a member of any shape. The member must have large- and small-diameter portions inserted in the hole of the ceramic body. After sintering, part of the rod presses part of the ceramic body in the cooling process.

According to the present invention as described above, a member made of a material having thermal expansion coefficient β satisfying relation α<α is fixed in ceramic having thermal expansion coefficient α although such fixing cannot be performed according to the conventional method.

In the above embodiment, the rod is a conductive rod. However, the present invention is not limited to this. In addition, the kind of ceramic and the material of rod are not limited to specific ones.

What is claimed is:

1. A method of fixing a member in a ceramic body, comprising the steps of:
   preparing a nonsintered ceramic body;
   forming a hole in the nonsintered ceramic body;
   inserting the member into the hole, the member including a first portion and a second portion being thinner than the first portion, at least a part of said first portion and at least a part of said second portion being located in the hole;
   sintering a resultant structure and bringing the ceramic body into tight contact with the member by shrinkage of the ceramic body, and
   cooling the sintered structure, wherein the thermal expansion coefficient of the ceramic body sintered by the step of sintering is smaller than the thermal expansion coefficient of the member, and pressing the first portion against a projection of sintered ceramic body which is provided in the hole by a shrinkage difference based on a difference between the thermal expansion coefficient of sintered ceramic body and the member, and fixing the member in the sintered ceramic body.

2. A method according to claim 1, wherein said cooling step comprises the step of cooling said ceramic body and said member, and making said first portion of said member directly press said ceramic body by the shrinkage difference resulting from the difference of the thermal expansion coefficients between said ceramic body and said member, so as to fix said member to said ceramic body.

3. A method according to claim 1, wherein the hole extends through the ceramic body, the member extends through the hole and the member has the first portion and the second portion located in the hole.

4. A method according to claim 1, wherein the hole is a blind hole, the member is inserted in the hole, and the member has the first portion and the second portion located in the hole.

5. A method according to claim 1, wherein the member has electric conductivity.

6. A method according to claim 1, wherein the member comprises at least one said second portion and a said first portion formed at both ends of the second portion and located in the hole.

7. A method acording to claim 1, wherein boundary portions between the second portion and the first portion of the member are inclined.

8. A method according to claim 1, wherein at least part of an outer surface of the first portion of the member is spherical.

9. A method according to claim 1, wherein a section of the first portion of the member is wedge-shaped.

10. A method according to claim 1, wherein the member comprises at least one said second portion and a said first portion formed at both ends of the second portion, the opening between the first portions is smaller than the surface of the second portion, and opposing side walls of each said first portion are inclined in opposing acute angle.

11. A method of fixing a member in a ceramic body, comprising the steps of:
    preparing the nonsintered ceramic body;
    forming a hole in the nonsintered ceramic body;
    inserting the member into the hole, the member including a first portion and a second portion being thinner than the first portion, at least a part of said first portion and at least a part of said second portion being located in the hole;
    sintering a resultant structure, wherein the thermal expansion coefficient of the ceramic body sintered by the step of sintering is smaller than the thermal expansion coefficient of the member and further wherein the step of sintering comprises sintering the ceramic body and bringing the ceramic body into tight contact with the member by shrinkage of the ceramic body, and
    cooling a resultant structure obtained by the step of sintering, pressing the first portion against a projection of sintered ceramic body so that at least a part of said first portion contacts said projecting portion so as to directly press said projection, said projection being provided in the hole by a shrinkage difference based on a difference between the thermal expansion coefficients of sintered ceramic body and the member, and fixing the member in the sintered ceramic body.

12. A method of fixing a member in a ceramic body, comprising the steps of:
    preparing a nonsintered ceramic body;
    forming a hole in the nonsintered ceramic body;
    inserting the member into the hole, the member including a first portion and a second portion being thinner than the first portion, at least a part of said first portion and at least a part of said second portion being located in the hole;
    sintering a resultant structure; and
    cooling the sintered structure, wherein the thermal expansion coefficient of the ceramic body sintered by the step of sintering is smaller than the thermal expansion coefficient of the member, and further wherein the step of preparing the nonsintered ceramic body comprises the step of preparing a tubular ceramic body to constitute a measuring pipe of an electromagnetic flowmeter,
    wherein the step of forming the hole comprises forming electrode mounting holes in a wall of the ceramic body for the measuring pipe,
    wherein the step of inserting the member comprises inserting electrodes into holes formed in prospective electrode mounting portions of said pipe, each of the electrodes being provided with first and second portions and a thermal expansion coefficient larger than that of the sintered ceramic body, and
    wherein the step of sintering comprises sintering the measuring pipe, cooling the measuring pipe to room temperature, fixing the electrodes into the measuring pipe, and sealing the holes of the measuring pipe with the electrodes.

13. A method of fixing a member into a ceramic body, the member having a thermal expansion coefficient smaller than that of the sintered ceramic body, comprising the steps of:
    preparing a ceramic body made of nonsintered ceramic;

forming a hole in the nonsintered ceramic body;

inserting the member into the hole, the member comprising a first portion and a second portion having a sectional area smaller than that of the first portion within an area corresponding to the hole;

sintering the ceramic body and bringing the ceramic body into tight contact with the member by utilizing shrinkage of the ceramic body, the thermal expansion coefficient of the sintered ceramic body being smaller than that of the member; and cooling a resultant structure obtained by the step of sintering, pressing the first portion against a projection of the ceramic body so that at least a part of said first portion contacts said projecting portion so as to directly press said projection, said projection being extended into the hole by a shrinkage difference due to a difference between the thermal expansion coefficients of the ceramic body and the member, and fixing the member in the ceramic body.

14. A method according to claim 13, wherein said member comprises at least one said second portion and a said first portion formed at both ends of the second portion, boundary portions between each said first portion and the second portion being inclined.

15. A method according to claim 13, wherein said member comprises at least one said second portion and a said first portion formed at both ends of the second portion, each said first portion having spherical outer surfaces, respectively.

16. A method according to claim 13, wherein said first portion comprises a spherical outer surface.

17. A method according to claim 13, wherein the member comprises at least one said second portion and a said first portion formed at both ends of the second portion, the opening between each said first portion is shorter than the surface of the second portion, and opposing said walls of each said first portion are included in opposing acute angle.

18. A method according to claim 13, wherein the step of preparing the ceramic body comprises the step of forming a measuring pipe of an electromagnetic flowmeter made of nonsintered ceramic, the step of forming the hole comprises the step of forming electrode mounting holes of the measuring pipe, the step of inserting the member comprises the step of inserting conductive electrodes in the holes, each of the electrodes having a first portion and a second portion and penetrating the wall of said measuring pipe, one end of each said electrode projecting outside of said measuring pipe, and the other end of each said electrode projecting inside said measuring pipe, the step of sintering comprises the step of sintering a resultant structure and bringing the ceramic body into tight contact with the electrode member by utilizing shrinkage of the ceramic, sintered ceramic having a thermal expansion coefficient smaller than that of the electrode member, and the step of cooling comprises the step of cooling the resultant structure prepared by the step of sintering, pressing the first portion against the projection of the measuring pipe inside the corresponding hole so that at least a part of said first portion contacts said projecting portion so as to directly press said projection by a shrinkage difference due to a difference between the thermal expansion coefficients of the measuring pipe and the electrode member, and fixing the electrode member in the measuring pipe.

* * * * *